(12) United States Patent
Jungmann et al.

(10) Patent No.: US 11,649,863 B2
(45) Date of Patent: May 16, 2023

(54) DISC BRAKE WITH A RESET DEVICE AND MOTOR VEHICLE WITH A DISC BRAKE

(71) Applicant: WABCO Europe BVBA, Brussels (BE)

(72) Inventors: Hans-Christian Jungmann, Gorxheimertal (DE); Martin Stumpf, Lampertheim (DE)

(73) Assignee: ZF CV Systems Europe BV, Brussels (BE)

( * ) Notice: Subject to any disclaimer, the term of this patent is extended or adjusted under 35 U.S.C. 154(b) by 287 days.

(21) Appl. No.: 16/897,327

(22) Filed: Jun. 10, 2020

(65) Prior Publication Data
US 2020/0393009 A1 Dec. 17, 2020

(30) Foreign Application Priority Data
Jun. 11, 2019 (EP) .................................... 19179446

(51) Int. Cl.
| | | |
|---|---|---|
| F16D 55/02 | (2006.01) | |
| F16D 65/00 | (2006.01) | |
| B60T 1/06 | (2006.01) | |
| F16D 55/226 | (2006.01) | |
| F16D 65/18 | (2006.01) | |
| F16D 65/52 | (2006.01) | |
| F16H 7/06 | (2006.01) | |
| F16D 125/34 | (2012.01) | |
| F16D 127/04 | (2012.01) | |

(52) U.S. Cl.
CPC .......... *F16D 65/0043* (2013.01); *B60T 1/065* (2013.01); *F16D 55/226* (2013.01); *F16D 65/183* (2013.01); *F16D 65/52* (2013.01); *F16H 7/06* (2013.01); *F16D 2125/34* (2013.01); *F16D 2127/04* (2013.01)

(58) Field of Classification Search
CPC ...... F16D 65/52; F16D 65/567; F16D 65/568; F16D 65/56; F16D 55/226; F16D 65/0043; F16D 65/183; F16D 2125/34; F16D 2127/04; B60T 1/065; F16H 7/06
See application file for complete search history.

(56) References Cited

U.S. PATENT DOCUMENTS

| | | | |
|---|---|---|---|
| 2010/0230219 A1* | 9/2010 | Helf | ...................... F16D 66/026 188/71.8 |
| 2014/0174862 A1 | 6/2014 | Gruber et al. | |

(Continued)

FOREIGN PATENT DOCUMENTS

| | | |
|---|---|---|
| CN | 101802436 A | 8/2010 |
| CN | 106062407 A | 10/2016 |

(Continued)

*Primary Examiner* — Nicholas J Lane
(74) *Attorney, Agent, or Firm* — Dickinson Wright PLLC

(57) ABSTRACT

A disc brake (1) for motor vehicles includes at least two brake pads (25, 26), an application unit (4) with a setting spindle (5) arranged axially in the direction of the brake pads (25, 26), and a resetting device (7) for central adjustment of the setting spindle (5) after reaching a degree of wear of the brake pads (25, 26). The resetting device (7) has a housing (8), a sensor (9), a resetting shaft (10), and an adapter (11) with a decentral output (12). In one example, the adapter (11) has a cover (13) and a chain drive (14) for to transmitting an actuating movement from the decentral output (12) to the resetting shaft (10).

9 Claims, 2 Drawing Sheets

(56) References Cited

U.S. PATENT DOCUMENTS

2017/0167556 A1* 6/2017 Knoop ................. F16D 66/021
2019/0072146 A1* 3/2019 Jungmann ............... F16D 65/18

FOREIGN PATENT DOCUMENTS

| | | | |
|---|---|---|---|
| CN | 107923459 A | 4/2018 |
| DE | 60124976 T2 | 6/2007 |
| DE | 202012001863 U1 | 3/2012 |
| DE | 102012111171 A1 | 5/2014 |
| DE | 102015013199 A1 | 4/2017 |
| DE | 102015013240 A1 | 4/2017 |
| EP | 3179126 A1 | 6/2017 |
| EP | 3244085 A1 | 11/2017 |
| WO | 2014041161 A1 | 3/2014 |
| WO | 2015107135 A1 | 7/2015 |

* cited by examiner

DISC BRAKE WITH A RESET DEVICE AND MOTOR VEHICLE WITH A DISC BRAKE

TECHNICAL FIELD

The present disclosure relates to a disc brake having a resetting device for a motor vehicle, the invention relating in particular to a compressed-air disc brake having a resetting device for a commercial vehicle.

BACKGROUND

Disc brakes generally have a resetting device for manually resetting at least one setting spindle arranged in the disc brake. The setting spindle is configured to set the air gap, i.e. the distance between brake pads and a brake disc. A uniform air gap ensures a uniform pressure point when applying the brake pads to the brake disc during a braking operation which is triggered by the driver by way of a brake pedal in the vehicle.

In the event that the brake pads have reached their degree of wear and an exchange of the brake pads appears necessary, the setting spindle is retracted by way of a resetting shaft arranged in the resetting device. After the resetting operation, the brake pads are situated in a starting position. The starting position is defined as the axial position of the brake pads without wear that is furthest away from the brake disc. In the starting position there can occur a simple exchange of the worn brake pads by the insertion of new brake pads in a brake carrier of the disc brake. After the new brake pads have been installed in the brake carrier of the disc brake, a feeding movement of the setting spindle is carried out by way of the resetting device until a predefined or a new air gap between the brake disc and the brake pads has been achieved.

A resetting device according to the aforementioned embodiment can be found in DE 10 2015 013 199 A1, for example. The resetting device is centrally integrated in the adjusting device. The sensor unit of the resetting device is configured to be hollow cylindrical such that the resetting shaft can be led through the sensor unit.

A further resetting device is disclosed in DE 10 2015 013 240 A1. The output, as a decentral output, is rotationally coupled to the resetting shaft via a fixedly installed gear mechanism. Moreover, the decentral output is fixedly installed with a back plate on which there is also arranged the sensor with the resetting shaft. The gear mechanism is formed by individual gearwheels which are connected to one another in the installed state. A gearwheel having an attachment for a tool is mounted on the decentral output of the resetting device. The resetting device is specifically formed for the use of decentral feeding and retraction of the setting spindle. Central feeding and retraction of the setting spindle by way of the resetting device is not possible.

SUMMARY

Proceeding from the prior art, the present disclosure provides a disc brake having a resetting device, with the resetting device being cost-effective and allowing decentral feeding and decentral retraction of the setting spindle.

The resetting device has an adapter with a decentral output. In cases in which a resetting shaft which is arranged centrally in the resetting device and which has a central tool engagement point cannot be reached by a tool, the resetting device can be converted by means of the adapter into a decentral resetting device.

In a further embodiment, the adapter has a cover and a chain drive. The chain drive connects the decentral output to the resetting shaft and transmits an actuating movement of the tool arranged on the decentral output from the decentral output toward the resetting shaft. The resetting shaft is arranged coaxially on the setting spindle. By way of the resetting shaft, the actuating movement of the tool is transmitted to the setting spindle which allows a feeding movement or a retracting movement of the brake pads.

In a further preferred embodiment, the chain drive is fixed with the cover by way of one or more fasteners in a force-fitting or positively locking manner, with the result that the chain drive and the cover form an assembly unit. The assembly unit can be fitted to the resetting device easily and without a high time expenditure. Conceivable fasteners are screws or rivets. With particular preference, the chain drive is screwed to the cover by means of a screw.

In a further embodiment, the adapter is then arranged on the resetting device by means of a plug connection and/or an adhesive connection on that side of a housing, also termed rear side, of the resetting device which is opposite to a sensor of the resetting device. For a plug connection, the adapter can for example have spring clamps which are fitted into openings in the housing of the resetting device, the openings being configured for the spring clamps. Also conceivable is an adhesive connection alone or in combination with the plug connection, with the adapter being retained on the rear side of the housing and then adhesively bonded.

To connect the adapter to the resetting device, in a further embodiment the housing of the resetting device has, on the side of the housing opposed to the sensor, a groove for receiving the adapter. The groove is peripheral and corresponds to the peripheral shape of the adapter.

In a preferred development, the housing has, on the side of the housing opposed to the sensor, at least one projection for retaining the chain drive. The chain drive comprises a base plate having a bore for receiving the central output of the resetting shaft, and the decentral output which is arranged on that side of the base plate opposite to the bore for receiving the central output. The decentral output and the base plate are advantageously formed in one piece as a casting. Centrally between the bore for the central output and the decentral output arranged on the base plate there are at least two further bores for receiving the at least one projection and for receiving the fastener, which fixes the chain drive with the cover. Moreover, a chain for transmitting the rotary movement of the decentral output to the resetting shaft is arranged peripherally around the base plate.

In a further embodiment, the decentral output is configured as a casting, which is formed as a hexagon, for receiving a tool. The decentral output does not have a special shape, with the result that a hexagon wrench is sufficient as a tool for a feeding movement or a retracting movement. The decentral output is not limited to a cast iron as material, but can also consist of other torsion-resistant materials, such as high-strength plastics.

In a further embodiment, the cover of the adapter is a plastic part or a metal part. Furthermore, the cover has, axially of the resetting device, an opening for receiving the decentral output. The opening encloses the decentral output. Moreover, for receiving the tool, the opening has a larger diameter than the part of the decentral output that is formed as a hexagon.

In a final embodiment, a motor vehicle comprises a disc brake having a resetting device, the resetting device having an adapter with a decentral output.

Selected exemplary embodiments of the invention will be explained below with reference to the appended drawings.

DETAILED DESCRIPTION OF THE DRAWINGS

Figure 1:
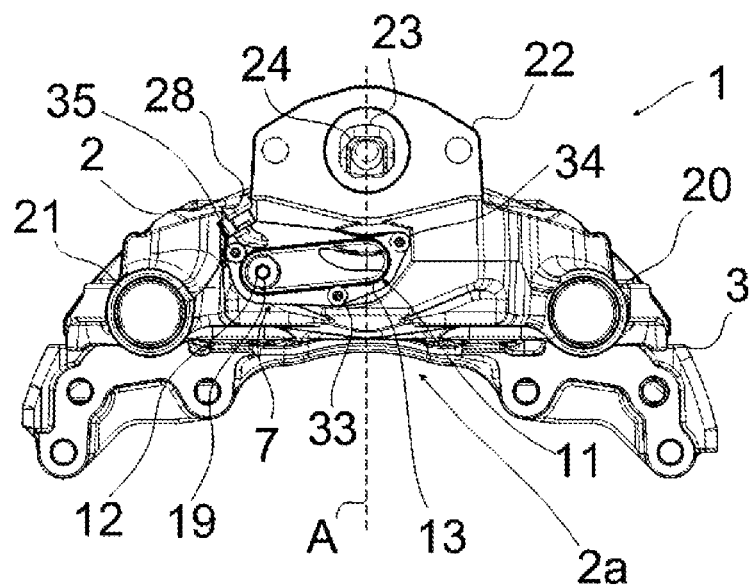
FIG. 1 shows a front view of a disc brake, with a resetting device.

FIG. 1 shows a disc brake 1 in a front view from the application side. The disc brake 1 has a brake caliper 2 which is mounted in a sliding manner on a brake carrier 3 via two guide bolts 20, 21. The brake caliper 2 has, for flange-mounting a brake cylinder (not shown), a flange surface 22 with an opening 23 for actuating a rotary lever 24. Below the flange surface 22 of the brake caliper 2, i.e. radially in the direction of the brake carrier 3, a resetting device 7 is arranged on the outer side 2a of the brake caliper 2. The resetting device 7 is configured to allow a manual retraction of a setting spindle 5 (see FIG. 2) arranged centrally in the disc brake 1 if one or two brake pads 25, 26 (see FIG. 2) have reached their degree of wear and have to be exchanged. The resetting device 7 is not inseparably connected to the brake caliper 2. Three screws 33, 34, 35, which connect the resetting device 7 to the brake caliper 2, allow exchange of the resetting device 7 or maintenance on the resetting device 7. An output 12 arranged decentrally, with respect to the disc brake axis A, is clearly visible on the resetting device 7. The output 12 is part of the adapter 11 of the resetting device 7. To counter environmental influences and mechanical effects, the adapter additionally has a cover 13 with an opening 19, and, for mechanical actuation, the output 12 is led through the opening 19 in the cover 13. The cover 13 is for its part fixed on a housing 8 (see FIG. 3) of the resetting device 7. A sensor 9, which is shown in FIG. 3, is supplied with current via a sensor connection 28, and the measurement signals are forwarded to a control unit (not shown).

Figure 2:
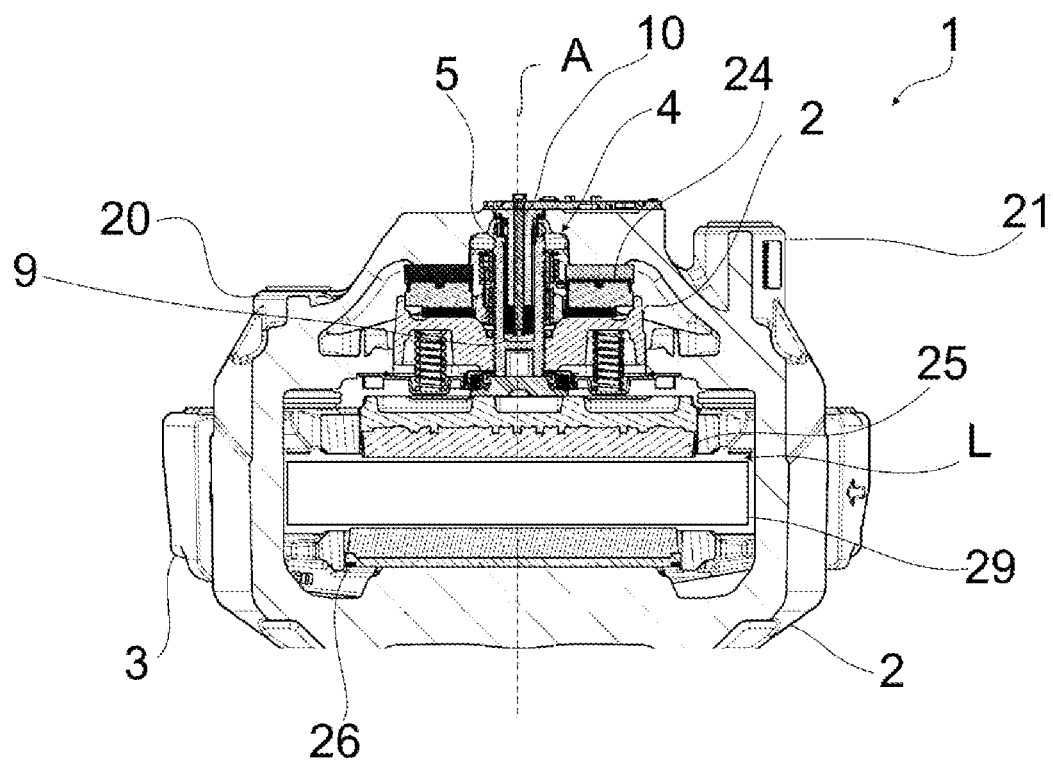
FIG. 2 shows a plan view of a disc brake according to FIG. 1.

A plan view of the disc brake 1 according to FIG. 1 is shown in FIG. 2. FIG. 2 is a sectional illustration of the disc brake 1, with the result that an application unit 4 is visible in the brake caliper 2 of the disc brake 1. The application unit 4 has for its part a setting spindle 5 for setting an air gap L between a brake disc 29 and a brake pad 25, 26. In the case of a brake pad change, the brake pads 25, 26 have to be retracted axially into their starting position. The starting position is to be understood as meaning the largest possible distance between one of the brake pads 25, 26 and the brake disc 29. For the resetting movement of the setting spindle 5 into the starting position, a resetting shaft 10 having the sensor 9 for detecting the axial setting movement of the setting spindle 5 is arranged centrally in the setting spindle 5. For feeding and retracting the setting spindle 5, the resetting shaft 10 is coupled to the output 12 by way of a chain drive 14 shown in FIG. 3.

Figure 3:
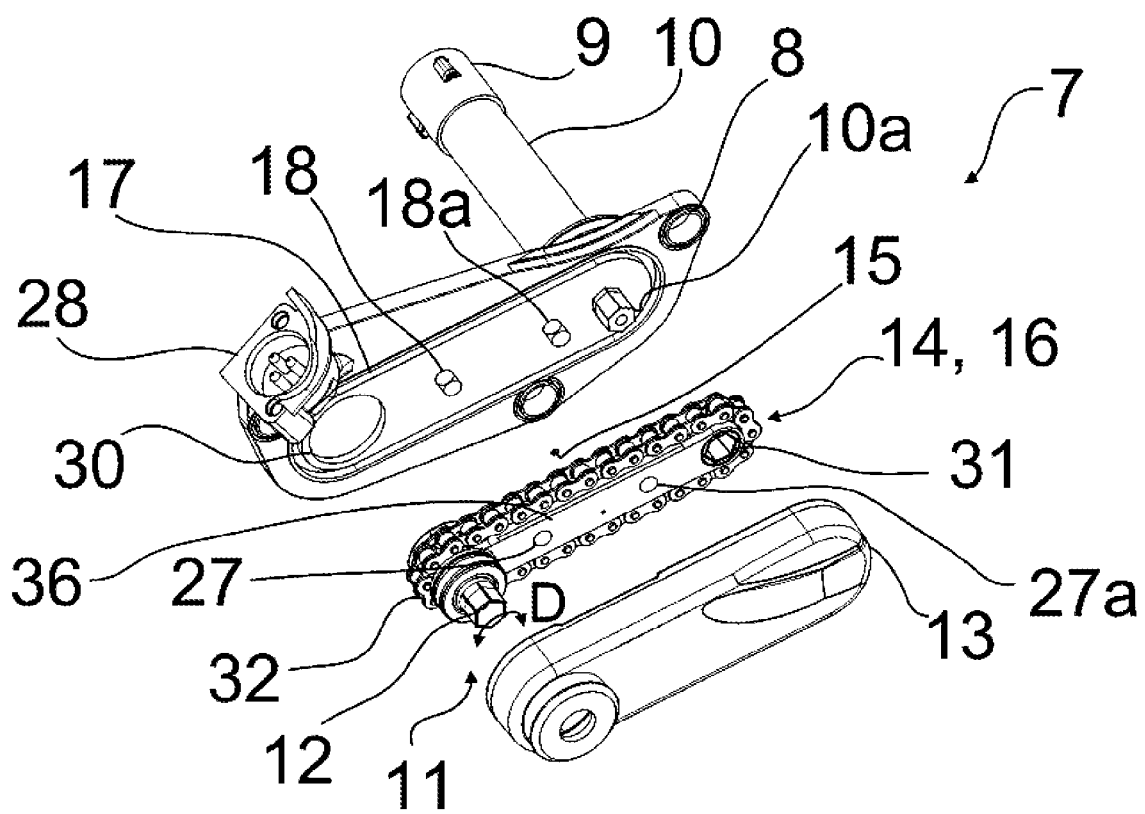
FIG. 3 shows a resetting device in detail.

FIG. 3 shows the resetting device 7 as an exploded drawing in detail. In addition to the components of the resetting device 7 that have already been described in FIG. 1 and FIG. 2, the chain drive 14 can clearly be seen in FIG. 3. The chain drive 14 is arranged as a component of the adapter 11 between the cover 13 and the housing 8. In concrete terms, the chain drive 14 is plugged axially as a plug connection 16 onto two projections 18, 18a of the housing 8, with the projections 18, 18a engaging in two bores 27, 27a of the chain drive 14. For better retention, the housing 8 additionally has a blind hole bore 30 for receiving the region of the chain drive 14 that is opposite to the output 12. A groove 17 incorporated in the housing 8 serves to receive and fix the cover 13. The chain drive is additionally fixed with the cover 13 in a force-fitting manner using a fastener 15, here shown to be a screw. Moreover, the output 12 is rotatably mounted and has the form of a hexagon cylinder. In addition, a bore 31 formed as a hexagon, termed hexagon bore 31 below, is arranged on the opposite side of the chain drive 14 to the output 12. The hexagon bore 31 serves for receiving an end region 10a of the resetting shaft 10. The end region 10a takes the form of a hexagon nut 10a. For the purposes of feeding or retracting the setting spindle 5, a hexagon wrench (not shown) plugged in the output 12 is rotated in the clockwise direction or in the counterclockwise direction by means of at least one rotary movement D. The rotary movement D is transmitted from the output 12 by means of a chain 32 of the chain drive 14 to the hexagon nut 10a of the resetting shaft 10 arranged centrally in the setting spindle 5. Depending on the direction of rotation D, the setting spindle 5 is then unscrewed into its starting position or screwed into a desired position in the direction of the brake disc 29 (shown in FIG. 1).

LIST OF REFERENCE SIGNS AS PART OF THE DESCRIPTION

1 Disc brake
2 Brake caliper
2a Outer side of the brake caliper 2
3 Brake carrier
4 Application unit
5 Setting spindle
7 Resetting device
8 Housing
9 Sensor
10 Resetting shaft
10a End region of the resetting shaft 10; hexagon nut
11 Adapter
12 Decentral output
13 Cover
14 Chain drive
15 Fastening means
16 Plug connection
17 Groove
18-18a Projections
19 Opening in the cover 13
20-21 Guide bolts
22 Flange surface of the brake caliper 2
23 Opening in the flange surface 22
24 Rotary lever
25-26 Brake pads
27, 27a Bores of the chain drive 14
28 Sensor connection
29 Brake disc
30 Blind hole bore
31 Hexagon bore
32 Chain
33-35 Screws
A Disc brake axis
D Rotary movement
L Air gap

What is claimed is:

1. A disc brake (1) for motor vehicles, comprising at least two brake pads (25, 26), an application unit (4) having a setting spindle (5) arranged axially in the direction of the brake pads (25, 26), and a resetting device (7) for central adjustment of the setting spindle (5) after reaching a degree of wear of the brake pads (25, 26), the resetting device (7) having a housing (8), a sensor (9) and a central resetting shaft (10), wherein the resetting device (7) has an adapter (11) with a decentral output (12);

wherein the adapter (11) has a cover (13) and a chain drive (14), the chain drive (14) being configured to transmit an actuating movement from the decentral output (12) to the central resetting shaft (10);

wherein the central resetting shaft is centrally located on the disc brake;

wherein the adapter is selectively removable from the housing, to provide for direct central actuation of the resetting shaft, and is selectively receivable on the housing, to provide for decentral actuation of the resetting shaft via the decentral output;

wherein the chain drive is fixed to the cover when the adapter is removed from the housing and the chain drive and the cover define a unit, and wherein the chain drive is retained on the housing when the adapter is received on the housing.

2. The disc brake (1) according to claim 1, wherein the adapter (11) is arranged on the resetting device (7) by a plug connection (16) or an adhesive connection.

3. The disc brake (1) according to claim 1, wherein the housing (8) has, on a side of the housing (8) opposed to the sensor (9), a groove (17) for receiving the adapter (11).

4. The disc brake (1) according to claim 1, wherein the decentral output (12) is a casting shaped as a hexagon for receiving a tool.

5. The disc brake (1) according to claim 1, wherein the cover (13) is a plastic part or a metal part and has an opening (19), through which the decentral output (12) extends.

6. A motor vehicle comprising a disc brake (1) according to claim 1.

7. The disc brake according to claim 1, wherein the cover and chain drive extend linearly in a lateral and downward direction from the resetting shaft to the decentral output.

8. A disc brake (1) for motor vehicles, comprising at least two brake pads (25, 26), an application unit (4) having a setting spindle (5) arranged axially in the direction of the brake pads (25, 26), and a resetting device (7) for central adjustment of the setting spindle (5) after reaching a degree of wear of the brake pads (25, 26), the resetting device (7) having a housing (8), a sensor (9) and a resetting shaft (10), wherein the resetting device (7) has an adapter (11) with a decentral output (12);

wherein the adapter (11) has a cover (13) and a chain drive (14), the chain drive (14) being configured to transmit an actuating movement from the decentral output (12) to the resetting shaft (10);

wherein the chain drive (14) is affixed to the cover (13) with a fastener (15) in a force-fitting or positively locking manner.

9. A disc brake (1) for motor vehicles, comprising at least two brake pads (25, 26), an application unit (4) having a setting spindle (5) arranged axially in the direction of the brake pads (25, 26), and a resetting device (7) for central adjustment of the setting spindle (5) after reaching a degree of wear of the brake pads (25, 26), the resetting device (7) having a housing (8), a sensor (9) and a resetting shaft (10), wherein the resetting device (7) has an adapter (11) with a decentral output (12);

wherein the adapter (11) has a cover (13) and a chain drive (14), the chain drive (14) being configured to transmit an actuating movement from the decentral output (12) to the resetting shaft (10);

wherein the housing (8) has, on a side of the housing (8) opposed to the sensor (9), at least one projection (18, 18a) for retaining the chain drive (14).

* * * * *